(No Model.)
G. LISPENARD.
COTTON PICKER STEM.
No. 457,743. Patented Aug. 11, 1891.
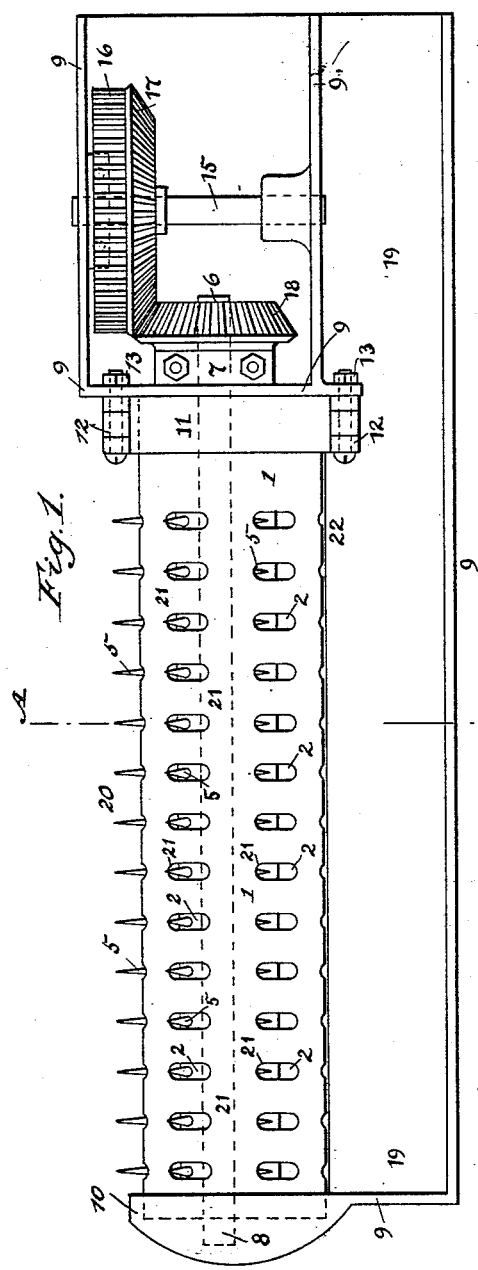
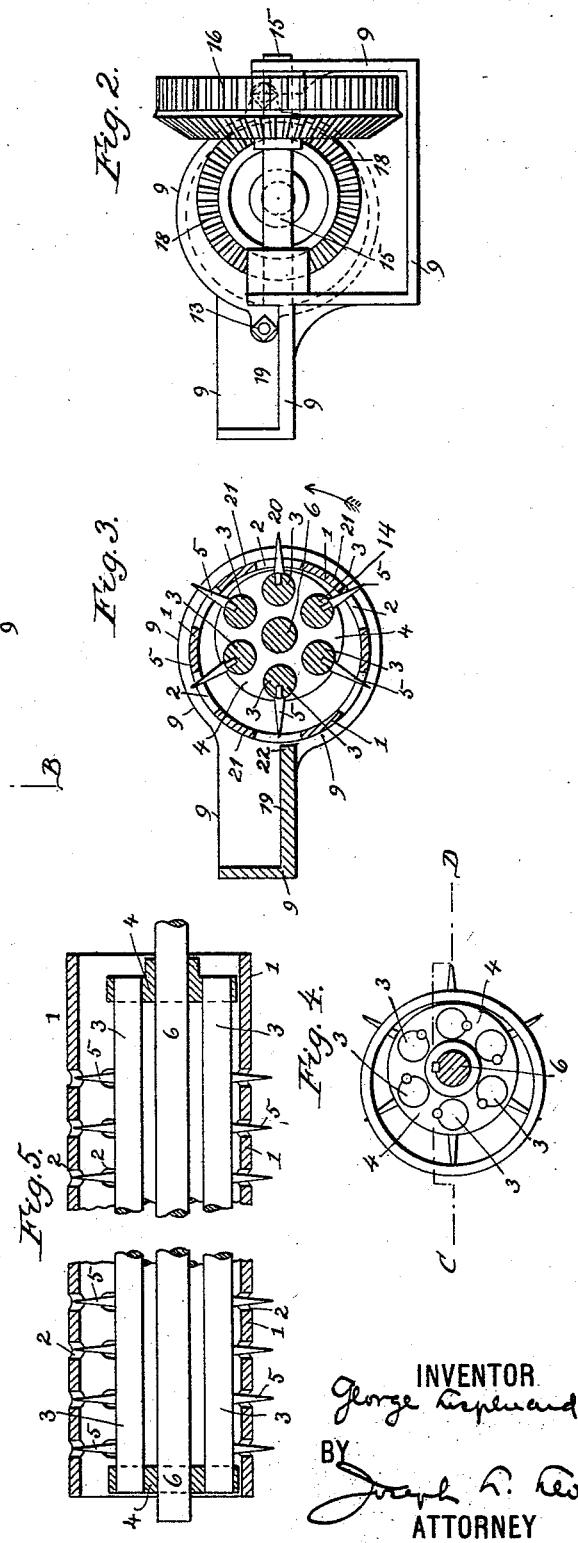
WITNESSES:
D. C. Reusch.
J. A. Baker.
INVENTOR
George Lispenard
BY
Joseph L. Levy
ATTORNEY

UNITED STATES PATENT OFFICE.

GEORGE LISPENARD, OF BROOKLYN, ASSIGNOR TO SOLOMON K. LICHTENSTEIN, TRUSTEE, OF NEW YORK, N. Y.

COTTON-PICKER STEM.

SPECIFICATION forming part of Letters Patent No. 457,743, dated August 11, 1891.

Application filed November 15, 1890. Serial No. 371,504. (No model.)

*To all whom it may concern:*

Be it known that I, GEORGE LISPENARD, a citizen of the United States, residing at Brooklyn, in the county of Kings and State of New York, have invented certain new and useful Improvements in Cotton-Picker Stems, of which the following is a specification, reference being had to the accompanying drawings.

My invention relates to that part of a mechanically-operated picking device which is known in the art as the "cotton-picker stem," and which is that part that is automatically projected out by the machine into contact with the cotton-plant, which mechanism picks the cotton out of the boll. This cotton-picker stem is carried by a machine which is drawn between the rows of cotton-plants, and automatically picks the ripe cotton.

Hitherto in cotton-picking stems great difficulty has been experienced in the action of the device in picking the cotton off the plant, it very often occuring that the picker will carry with it portions of the plant—such as the boll, branches, leaves, &c.—and also that in carrying the cotton to other devices, by which the cotton is removed to some other part of the machine, the cotton either becomes clogged in the picking mechanism or the picking mechanism throws the cotton away from it, thereby losing a great deal of the same, or the releasing of the cotton from the picking mechanism is attended with a great deal of difficulty and uncertainty. These disadvantages I propose to do away with in my device; and to that end the novelty of the same consists in the construction, combination, and arrangement of the picking devices, as will be hereinafter more fully described, and particularly pointed out in the claims.

In the accompanying drawings the same letters of reference indicate the same parts of the invention throughout the several views.

Figure 1 is a plan view of the cotton-picker stem when suitably supported within a frame, as will be hereinafter described. Fig. 2 is an end elevation of Fig. 1. Fig. 3 is a transverse cross-section of the picker-stem and frame for carrying the same, taken on the line A B, Fig. 1. Fig. 4 is an end elevation of the picker-stem, showing it removed from its supporting-frame. Fig. 5 is a horizontal cross-section of the same, taken on the line C D, Fig. 4.

In the drawings, 1 is a cylinder provided with peripheral slots 2 cut into it at predetermined places. This I call the "outer" cylinder. Within the outer cylinder I locate what I term the "inner" cylinder, which consists of a series of rods 3, which are firmly secured to circular heads 4 at their ends. These rods 3 are provided with hackle-pins 5, which are pointed and which are radially arranged upon the rods, which rods are preferably arranged in a circle. The points of the hackle-pins describe a circle which is concentric to the circle described by the axes of the rods, this circle having its center in the axis of the spindle. Centrally located within the two heads is the shaft or spindle 6, to which the heads are securely fastened. The spindle 6 is mounted to rotate in bearings, which are provided for it at the points 7 and 8 on the frame 9. The outer cylinder 1 is also mounted to rotate in the frame 9, one end of which is placed in the counterbored portion 10, as shown in dotted lines, the other end being held in collars 11, which are detachably secured together and to the frame 9 by means of the hinged sections 12 and bolts 13. Both the outer and inner cylinders carrying the hackle-pins are mounted to rotate eccentrically with each other—that is to say, the axis of the inner cylinder is not the axis of the outer cylinder, but both have the same speed of rotation with each other. This is accomplished in this particular instance by so counterboring the head 10 of the frame 9 and locating the collars 11 that when the outer cylinder is placed in position the inner cylinder will approach to the inner surface of the outer cylinder to the greatest extent, thereby projecting the hackle-pins at one side out from the outer cylinder. When this is done, it will be noticed that the ends of the hackle-pins are completely withdrawn from the outer or operative surface of the outer cylinder on the other side. Thus it will be seen that at certain fixed points on the outer cylinder the hackle-pins are in a position of complete projection and at a point preferably diametrically opposite they are completely withdrawn.

The outer cylinder rotates with the inner cylinder, and this is accomplished by the hackle-pins bearing against the sides of the slots, as shown at 14, Fig. 3, the direction of the rotation of the same being as indicated by the arrow.

The means for rotating the spindle 6 may be as shown in the drawings, consisting of a spindle 15, mounted in suitable bearings in the frame 9, a pinion 16, secured to the spindle 15, beveled gearing 17, secured to the pinion 16, and beveled gearing 18, meshed with gearing 17 and secured to the spindle 6, power being obtained in any desirable manner and being operatively connected to the pinion 16. Any other arrangement of devices may be used for rotating the spindle 6 and with it the outer and inner cylinders. The trough-like portion 19 of the frame 9 may also be provided with means for withdrawing or carrying the cotton, after it has been picked, back into the machine, there to be dealt with as desired.

If it is desired that the pins be projected to a greater or less degree or retracted to a greater or less degree, it is only necessary to bring the spindle which defines the central axis of the pins nearer to or farther away from the central axis of the outer cylinder, this being simply a matter of adjustment. This can be accomplished during the construction of the stem by placing the bearings 7 and 8 for the spindle 6 nearer to or farther away from the central axis of the outer cylinder.

In operating the machine the frame 9 will be projected against the cotton-plant, and the pinion, bevel, and gears being suitably rotated the spindle carrying the inner cylinder and hackle-pins will be rotated also, and with it the outer cylinder, as before explained. The point of greatest projection of hackle-pins, which in this case is at the point marked 20, Figs. 1, 3, and 4, is the point which it is intended to put in operative contact with the cotton, so that as the stem is rotated it will pick the cotton out from the boll, the operative surface 21 of the outer cylinder preventing the hackle-pins from penetrating the boll and carrying portions of the same with them. The hackle-pins then having the cotton upon them—say at their greatest point of projection, as before described—rotate, for example, in the direction of the arrow, and as they rotate they recede gradually within the operative surface of the outer cylinder, so that by the time they have arrived at the ledge 22 of the trough 19 they have discharged the cotton, either by dropping it into the trough or by reason of the ledge 22 brushing or scraping it off. It will be seen that the outer cylinder can be brought into close contact with this ledge and as it arrives at that point the brushing off of the cotton from the operative surface of the outer cylinder will be insured. It will also be seen that the hackle-pins do not release their hold of the cotton until the cotton has passed the perpendicular axes of both the inner and outer cylinders, thereby insuring the falling of the cotton into the trough 19, even if it should become released from the hackle-pins.

By reason of the eccentric relation of the inner and outer cylinders to each other the complete projection and retention of the hackle-pins is constantly preserved at the same points and the picking and discharging of the cotton will be accomplished without arresting the rotation of the stem at all, so that it is not necessary to rotate the stem one way to pick and in the opposite direction to discharge. The line of entry and departure of the hackle-pins from the periphery of the outer cylinder is tangential.

The picking and discharging during continuous rotation has great advantages over that done by oscillating devices, in that it very often occurs that oscillating devices have to operate so quickly that the cotton is very often thrown out of contact with the pickers, which is not liable to occur in my device, as the operation of picking and discharging is continuous and steady.

Instead of the hackle-pins being affixed to bars, as shown, they may be secured to a cylinder and other changes and modifications may be made in the device to suit particular circumstances or conditions without departing from the spirit of my invention.

Having thus described my invention, what I claim, and desire to secure by Letters Patent, is—

1. In a cotton-picker stem, a picker device comprising a series of bars arranged concentrically about a central spindle, a series of hackle-pins extending from said bars radially from the axis of the said spindle, and an exterior cylinder having a series of openings, through which said hackle-pins may be projected or withdrawn, the said outer cylinder being eccentrically disposed about the said spindle and rotated therewith and at the same speed, substantially as described.

2. In a cotton-picker stem, a picking device consisting of a series of bars provided with radially-projecting pins, heads into which the said bars are rigidly fixed, a spindle passing centrally through said heads and bars, and an exterior cylinder eccentrically disposed about the bars and having a series of slots, through which said pins are projected and withdrawn, the outer cylinder being rotated with and at the same speed as the inner cylinder, substantially as described.

3. In a cotton-picker stem, a picking device consisting of an inner cylinder provided with a series of radially-projecting pins, an outer cylinder eccentrically disposed about the inner cylinder, having a series of slots through which said pins may be projected or withdrawn by the simultaneous rotation of the cylinders at the same speed, and a fixed ledge for receiving the cotton from the pins, which ledge is in close juxtaposition to the outer surface of the outer cylinder, substantially as described.

4. In a cotton-picker stem, the combination of an inner cylinder mounted to rotate and provided with radially-projecting pins, and an outer cylinder arranged eccentrically to the inner cylinder and provided with slots, said outer cylinder being rotated by the pins on inner cylinder coming in contact with its slotted surface, substantially as described.

5. In a cotton-picker stem, a picking device consisting of an inner cylinder provided with a series of radially-projecting pins, an outer cylinder having a series of slots, through which said pins may be projected or withdrawn, said outer cylinder being disposed eccentrically about the inner cylinder, both rotating together and at the same speed, and a ledge for receiving the cotton from the pins, substantially as described.

6. The combination, with the frame 9, having a head 10, of a cylinder 1, having a series of slots 2, rotatably secured in the head 10 at one end and in the frame 9 at the other, the spindle 6, mounted to rotate in the frame, heads 4, secured to the said spindle, longitudinally-extending bars 3, secured to the said heads, and radially-extending hackle-pins 5 on the bars 3, the said cylinder 1 being eccentrically disposed about the said spindle and rotating with it, substantially as described.

7. In a cotton-picker stem, the combination of the frame 9, having the detachable collar 11 and head 10 of the shaft 6 rotatably secured in the frame and passing through the collar, heads 4 on said spindle, bars 3, extending longitudinally between the heads and having hackle-pins 5, extending radially therefrom, and an outer cylinder 1, provided with a series of slots 2, the said outer cylinder being rotatably secured at its ends in the collar 11 and head 10 and disposed eccentrically about the said spindle, substantially as described.

GEORGE LISPENARD.

Witnesses:
S. K. LICHTENSTEIN,
MORRIS S. WISE.